United States Patent [19]

Yawn et al.

[11] Patent Number: 4,650,997

[45] Date of Patent: Mar. 17, 1987

[54] INFRARED TARGET IMAGE SYSTEM EMPLOYING ROTATING POLYGONAL MIRROR

[75] Inventors: Gary W. Yawn, Stone Mountain; Richard P. Hartwig, Marietta, both of Ga.

[73] Assignee: Image Systems, Inc., Tucker, Ga.

[21] Appl. No.: 714,468

[22] Filed: Mar. 21, 1985

[51] Int. Cl.[4] .......................... H01J 3/14; G02B 26/08
[52] U.S. Cl. ..................................... 250/236; 350/6.5; 350/6.7; 350/6.8
[58] Field of Search ............... 250/234, 235, 236, 334; 350/6.1, 6.2, 6.3, 6.4, 6.5, 6.6, 6.7, 6.8, 6.9

[56] References Cited

U.S. PATENT DOCUMENTS 4,520,504  5/1985  Walker et al. ........................ 382/1

FOREIGN PATENT DOCUMENTS 0051539  4/1979  Japan ..................................... 350/6.5

Primary Examiner—Edward P. Westin
Assistant Examiner—Stephone B. Allen
Attorney, Agent, or Firm—Jones & Askew

[57] ABSTRACT

A rotating polygonal mirror which scans a target both vertically and horizontally in a raster scan electromagnetic illumination or detection system is disclosed. The rotating mirror includes a plurality of individual planar facets disposed around the periphery of the mirror. The facets are arranged so that each of them intersects the principal axis of rotation of the mirror at a predetermined angle characteristic of the particular facet. A perpendicular to each facet drawn from the substantial center of the facet in its horizontal dimension passes through the axis of rotation. By this geometry, a target is scanned by horizontal scan lines in a manner which is equivalent to prior art mirrors having a plurality of facets all of which are parallel to the axis of rotation, and the vertical stepping of the raster scan is accomplished by stepping between adjacent facets of the mirror having distinct angles of intersection with the axis of rotation. An infrared, raster scan detection system in which a plurality of parallel horizontal scan lines are scanned by each facet of the mirror is also disclosed.

4 Claims, 7 Drawing Figures

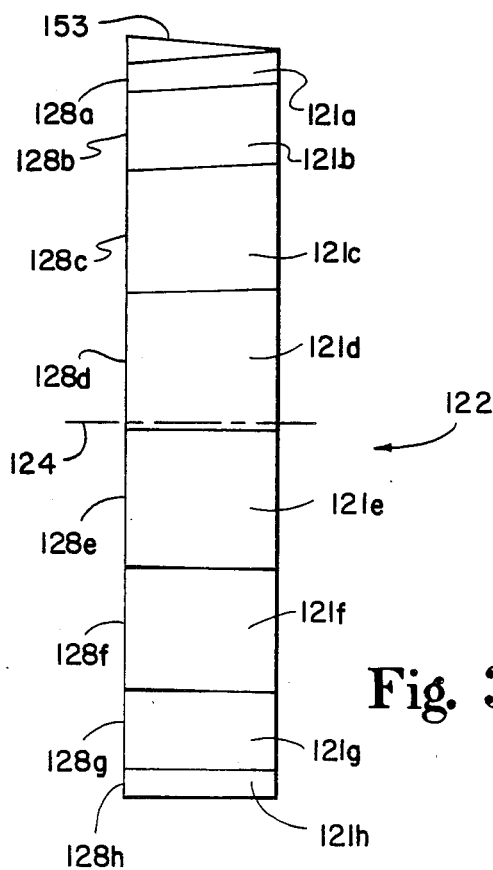
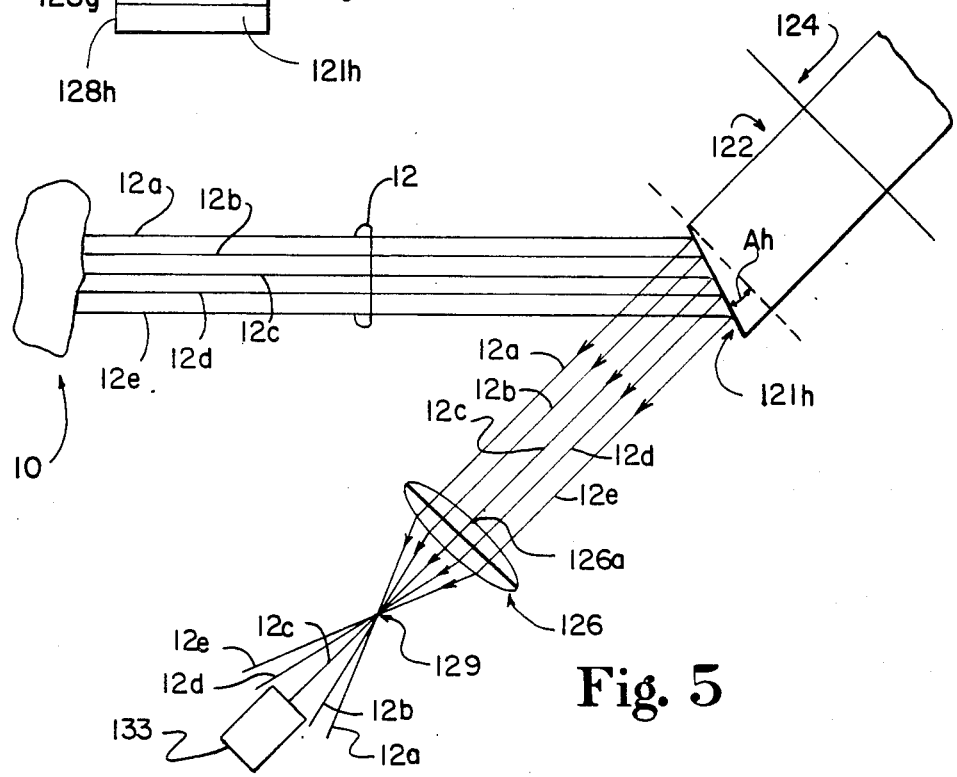
Fig. 3
Fig. 5

INFRARED TARGET IMAGE SYSTEM EMPLOYING ROTATING POLYGONAL MIRROR

TECHNICAL FIELD

The present invention is an improvement to infrared and other electromagnetic target scanning systems using a novel rotating polygonal mirror.

BACKGROUND OF THE INVENTION

Conventional passive infrared target scanning systems typically use two focusing lenses, a vertical scan mirror, a flat-faceted rotating regular polygonal mirror for horizontal scanning, and a single infrared detector, as shown in FIG. 1. The operation of a typical passive infrared target scanning system may be briefly described as follows. A target 10 will emit infrared radiation at an intensity which depends on, among other factors, its temperature. The radiation 12 emitted by a particular small area 11 on the target 10 is focused by a focusing lens 13 onto the vertical scan mirror 15. The radiation 12 is reflected by mirror 15 onto a facet 21 of a rotating, flat-faceted regular polygonal mirror 22, is then reflected by facet 21 of mirror 22, and is focused by focusing lens 26 onto infrared detector 33.

As is well known to those skilled in the art, vertical scanning of target 10 is achieved by moving the angle, $\theta$, of mirror 15 through a predetermined range. As is also well known to those skilled in the art, horizontal scanning of the target 10 is achieved by rotating regular polygonal mirror 22 at a predetermined constant speed, where mirror 22 has a plurality of facets 21, the plane of each facet being aligned with, or at the same angle with respect to, the axis of rotation 24 of mirror 22. Normally the plane of each facet 21 is parallel to the axis of rotation 24. Therefore, the sequence of operation in a typical system is: scan one horizontal line of target area 11, adjust the angle $\theta$ of mirror 15 to scan the next, usually lower, horizontal line of target area 11, scan the next horizontal line of target area 11, and so on, until the entire target has been scanned.

A typical passive infrared target scanning system will also require that the infrared detector 33 be maintained at a temperature of approximately $-40°$ C., and will therefore be enclosed in a cooling chamber 31 which has a window 30 made of a material which will pass infrared radiation 12 and still maintain the integrity of cooling chamber 31. Devices for moving the angle $\theta$ of mirror 15 through a predetermined range by a vertical scan motor 16 and a drive shaft means 17 are well known. Normally motor 16 is a stepping motor which incrementally rotates mirror 15 for each vertical step in the raster pattern. Likewise, means of rotating regular polygonal mirror 22 at a constant, predetermined speed by a motor 27 and a drive shaft means 23 are also well known. Motors 16 and 27 typically provide position information to a signal processor 35 over conductors 41 and 42, respectively. The output of detector 33 is provided to signal processor 35 over conductor 34. The outputs of signal processor 35 are provided to a display device 36 over conductor 37. Display device 36 then displays the perceived image 38 of target 10. The methods by which signal processor 35 processes the position information and detector outputs to produce a synchronized target image 38 are well known to those skilled in the art and will not be belabored here. The image 38 typically may be "black-and-white" (monochrome) or "false color". False color displays are ones for which predetermined colors represent various intensity levels of the output signal.

A typical passive infrared target scanning system suffers from several disadvantages: reduced performance if lenses 13 and 26 are not cooled because they will emit blackbody radiation which is detected by detector 33 and appears as noise to processor 35; a large cooling chamber or several smaller cooling chambers if lenses 13 and 26 are to be cooled; numerous windows 30 if more than one cooling chamber is used; and sophisticated means to maintain synchronization between the position of mirror 15 and the position of regular polygonal mirror 22.

While such systems work well and have proven their utility, their major shortcoming is that they are expensive. As noted above, this is due to the cooling systems required for elements in the optical path, and the expense of the precision parts used in the scanning system. Since a major part of the expense of such systems is the electro-mechanical scanning apparatus, there is a need in the art for a simpler, less expensive system for producing electro-mechanically implemented raster scans.

SUMMARY OF THE INVENTION

The present invention overcomes the above-described disadvantages of typical prior art passive infrared target scanning systems.

Generally described, the present invention is an angle-faceted polygonal mirror which accomplishes both horizontal and vertical scanning of a target when used in an infrared target scanning system.

In a system employing the present invention, a polygonal mirror is rotated at a constant speed by a constant speed motor. A focusing lens and a plurality of infrared detectors are employed. The output of the detectors is provided to a signal processor and an image display device which may be conventional in nature.

Rather than accomplish stepping in one dimension (normally vertical) by using a stepping motor to incrementally rotate a separate mirror, the polygonal mirror of the present invention employs planar facets having angles with respect to the angle of rotation of the entire mirror which differ by a predetermined incremental angle between adjacent facets. In the preferred form, the angle of a first facet with respect to the axis of rotation is selected to have an initial value which represents one extreme of the possible angles. Proceeding in a predetermined rotational sense around the periphery of the mirror, the angle between each successive facet and the axis of rotation decreases until one of the facets is substantially parallel to the axis of rotation. Continuing in the same direction around the mirror, the angles of the facets with respect to the axis of rotation continue to change in the same sense until the facet adjacent the original facet reaches a maximum angle which is opposite in sense to that of the first facet. When the mirror next steps to the first facet, a vertical retrace is accomplished.

It should be noted from this description that the present invention also eliminates the mechanical inertia of prior art systems using a planar mirror driven by a stepping motor for accomplishing the vertical scan.

Generally speaking, a mirror constructed according to the present invention will be used in a system having a total of M horizontal scan lines in its raster. If the mirror is constructed using K facets, and a total of J detectors are used so that J horizontal lines of the target are scanned by each facet of the mirror, then it will be apparent that $M = J \times K$.

In the system environment in which the preferred embodiment was originally developed, J was equal to 8 and K was equal to 16. Therefore, the system in question employed 128 horizontal scan lines in its raster. Thus, with values for M and J determined by the system in which the present invention in employed, the equation $K = M/J$ describes the number of facets on the embodiment of the present invention to be used. However, it will be apparent to those skilled in the art that the foregoing equation is based on the assumption that one complete scan of the raster is accomplished for each complete rotation of the mirror. Therefore, a more general form of the expression is $K = n(M/J)$, where n is a positive integer and represents the number of complete scans of the target accomplished on each rotation of the mirror. Naturally, in embodiments of the present invention where n is greater than 1, there will be n sets of facets with identical angles with respect to the axis of rotation.

Furthermore, if $t_1$ is defined as the scanning time for a single horizontal line in seconds, it will be apparent that the period of rotation $T_r$ for the mirror is given by $T_r = t_1(K)$. Thus, the rate of rotation in revolutions per minute is equal to $60(1/T_r)$. In this equation, $t_1$ represents the entire scan line time including that time which is normally associated with horizontal retrace in a raster pattern.

Systems employing the preferred embodiment are designed in a straightforward manner so that a predetermined fraction of the time it takes for a particular facet to rotate past a reference point is used as the active portion of the scan line. The signal is either blanked or ignored, by virtue of not being focused on a detector, when regions constituting the boundaries between adjacent facets are rotated into the optical path.

While the present invention was developed, and is particularly useful in the environment of an infrared scanning system, it will be apparent to those skilled in the art that the present invention is useful in any system in which an electromechanical device is needed for generating a raster scan of an electromagnetic signal. For example, the embodiment of the present invention would be useful in generating a raster pattern for a laser display.

Thus it is an object of the present invention to provide a means for accomplishing both horizontal and vertical scanning of a target by a single, rotating, angle-faceted polygonal mirror.

It is a further object of the present invention to provide an infrared target scanning system with a reduced number of moving components.

It is a further object of the present invention to provide an infrared target scanning system with a reduced number of infrared components.

It is a further object of the present invention to provide an infrared target scanning system with a reduced number of components that must be cooled.

It is a further object of the present invention to provide in an infrared target scanning system with a reduced size and number of cooling chambers.

It is a further object of the present invention to simplify the vertical scan-to-horizontal scan synchronization apparatus in an infrared target scanning system. Furthermore, it is an object of the present invention to eliminate mechanical inertia from the step of vertical retrace in an infrared scanning system.

Other objects, features and advantages of the present invention will become apparent upon reading the following description of the preferred embodiment.

BRIEF DESCRIPTION OF THE DRAWINGS

FIG. 3 is an elevational view of the angle-faceted polygonal mirror of the preferred embodiment.

FIG. 5 is side-view illustration of the path of radiation from a target to the detector.

DETAILED DESCRIPTION OF THE PREFERRED EMBODIMENT

Figure 1:
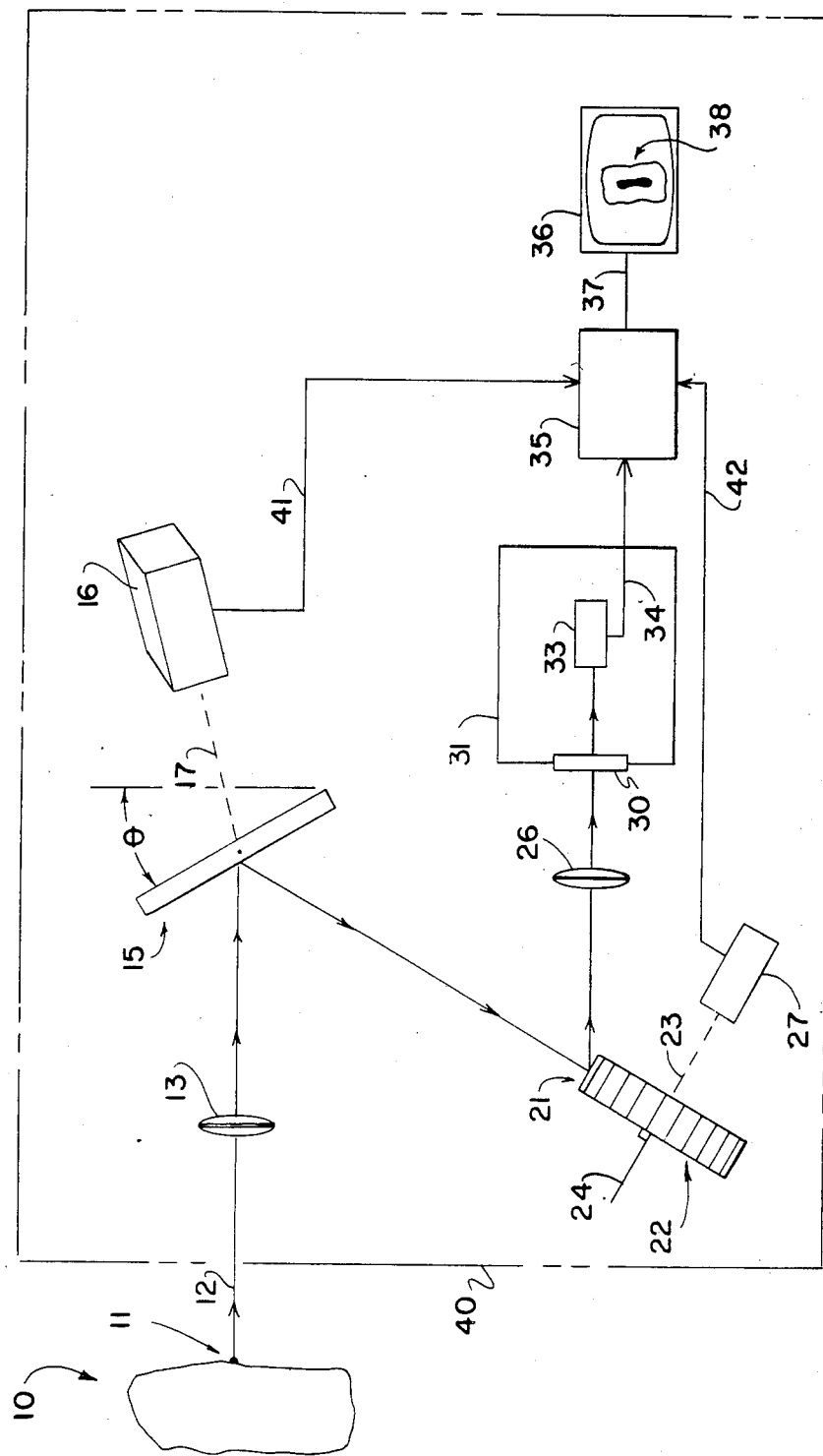
FIG. 1 is a block diagram of a typical prior art passive infrared target scanning system.

Turn now to the drawings, in which like numerals reference like parts throughout the several figures. FIG. 1 is a block diagram of the typical prior art passive infrared target scanning system which was described in the Background Of The Invention above.

Figure 2:
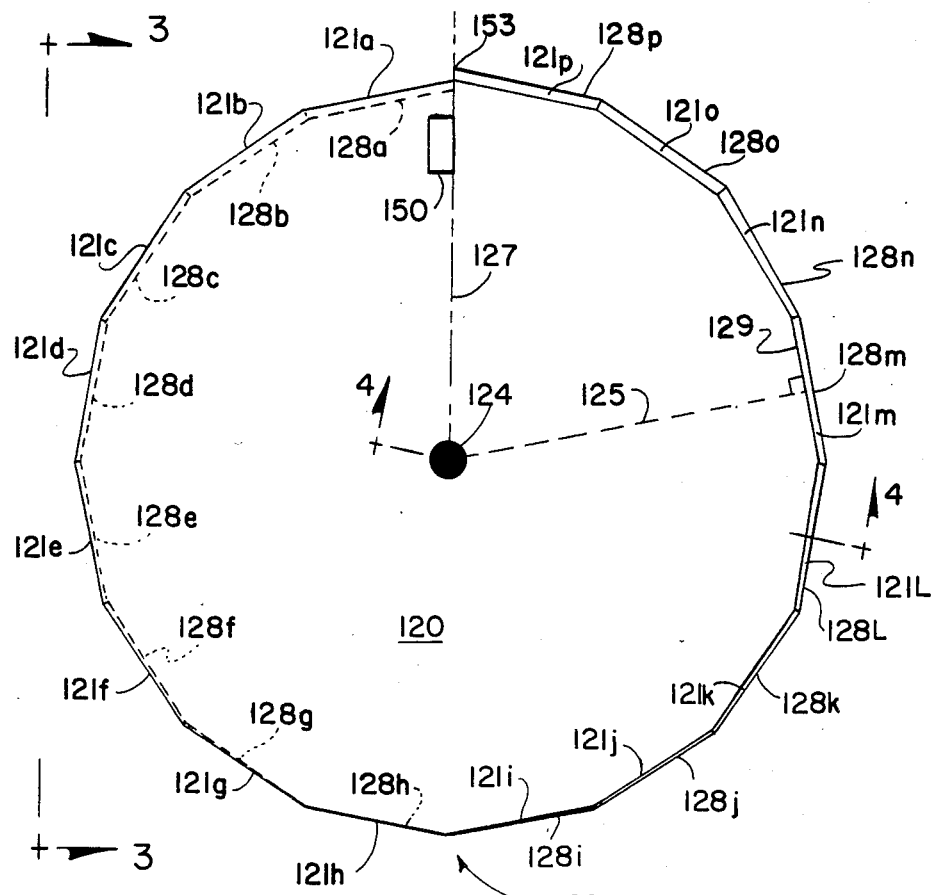
FIG. 2 is a top plan view of the angle-faceted polygonal mirror of the preferred embodiment.

Turn now to FIG. 2, which is a top plan view of the preferred embodiment of the present invention, and to FIG. 3, which is an elevational view of the preferred embodiment. From an inspection of FIGS. 2 and 3 it will be appreciated that the preferred embodiment is a mirror 122, having a top surface 120 in the shape of a regular polygon. A principal axis of rotation 124 is perpendicular to the plane of top surface 120. The mirror has sixteen sides or facets 121a–121p, each facet being a planar surface disposed at a respective predetermined angle with respect to the principal axis 124, and being highly reflective at infrared wavelengths. The distance of a radial 125 from the principal axis 124 to the center of the top edge 128 of a facet is 3.000±0.002 inches. The height of each facet 121 along a projection parallel to principle axis 124 is 1.25±0.01 inches. Each facet subtends an angle of approximately 22.5 degrees. The angular tolerance between adjacent facets 121 is 1.25±0.25 degrees, and the cumulative angular error must be less than or equal to one degree. The surface flatness of a facet 121 is one fringe or 10 microns, and the finish of a facet 121 is one-tenth wavelength or 1 micron, for a wavelength of 10 microns. The preferred material for construction of the present invention 122 is 6061-T6 aluminum since it is highly reflective at infrared wavelengths. It will be appreciated by those skilled in the art that embodiments of the present invention may be configured as the solid polygonal mirror depicted in FIG. 2, or as an anulus with hub and spokes, or other configuration wherein mass is removed from the central portion of the body so that the weight of the body is substantially reduced without unacceptably reducing the moment of inertia or compromising the structural characteristics of the mirror. It will be appreciated that the amount of mass that may be removed from the body will also depend upon the speed at which the present invention 122 is rotated and the tensile strength of the material used.

It is well known that the NTSC standard used for cathode ray tube ("CRT") display in broadcast television in the United States of America is sixty fields per second and that this value was selected to prevent "flickering" of the image displayed on the CRT. Many other CRT display formats use 60 fields per second to prevent flickering. Also, synchronization signals for a 60 Hz field rate are easily derived from the 60 Hz frequency of U.S. power lines. Since one revolution of the preferred embodiment 122 corresponds to one complete target scan or field it is readily seen that, to display sixty independent fields per second, the present invention 122 would have to be rotated at sixty revolutions per second, or 3,600 R.P.M. This speed is well within the state of the art but has the disadvantages of requiring wide-bandwidth video circuits and very high speed logic and memory devices, which means significantly higher power consumption, significantly higher heat dissipation requirements, and a substantial increase in the price of the components. These disadvantages are sufferable only if the target characteristics change at a sufficiently rapid rate to require sixty independent fields per second.

In many applications, the target characteristics change at a rate such that a target scan rate of thirty independent fields per second provides adequate information about the target. The application for which the preferred embodiment 122 was designed allows the use of a slower target scan rate of thirty fields per second and the mirror 122 is rotated at the lower speed of 1,800 R.P.M., therefore allowing the use of lower bandwidth video circuits and slower logic and memory devices, and thereby avoiding the disadvantages listed above. It will be appreciated that displaying the target image at only thirty fields per second will cause flickering but that the flickering may be avoided by displaying each field twice, so that sixty fields are displayed per second.

Embodiments of the present invention may be used in an apparatus which performs other analysis, rather than direct display, of infrared or other electromagnetic signals scanned from a target. Therefore, the use of apparatus generating thirty independent fields per second and displaying sixty fields per second is disclosed so that the environment in which the preferred embodiment of the present invention was designed will be appreciated and should not be considered as limiting the scope of the present invention. Adopting the conventions of the equations recited above in the Summary of the Present Invention, it will be appreciated that the preferred embodiment rotating thirty times per second is a rotational period $T_r$ equal to 33.33 milliseconds. Since k is equal to 16 in the preferred embodiment, the total time for scan line $t_1$ (including the time corresponding to horizontal retrace) is 2.083 milliseconds.

In FIG. 2 the sense of change of the angle of the plane of each facet with respect to the axis of rotation 124 may be seen from the locations of the lower edges 128 of the facets 121. Lower edges 128 for facets 121a–121g are shown in phantom. Since FIG. 2 is a top plan view, it will be appreciated that the lower edges 128 for these facets are closer to the axis of rotation 124 than the upper edges of the facets shown in asserted form on the drawing. For facet 121h, the upper edge and the lower edge are colinear in FIG. 2, indicating that facet 121h defines a plane parallel to the axis of rotation 124. As one proceeds in a counterclockwise direction around FIG. 2, it will be appreciated that the lower edge 128 for each respective facet 121h–121p extends a farther distance from the top edge of each respective facet indicating an increase in the angle between the plane of each respective facet and principal axis 124.

Therefore, if one postulates an electromagnetic ray travelling in the plane of the paper for drawing FIG. 2 toward principal axis 124, it will be appreciated that the wave will be reflected in the following sense from different ones of facets 121. Assume for the moment that the mirror is rotating in a counterclockwise direction as shown in FIG. 2 and that the first facet struck by the ray is facet 121p. Since the lower edge 128p of this facet extends farther from axis 124 than the upper edge, the hypothetical ray would be reflected from facet 121p in a direction with a vertical component which took it out of the page. As facet 121o was rotated into the path of the ray, the direction of the reflected ray from this surface would also have a vertical component out of the page. However, it will be readily appreciated that the angle of departure from the plane of the page will be less than for the ray reflected from facet 121.

This sequence proceeds, with the ray reflected from each reflective facet having a vertical component forming a smaller angle with respect to the plane of the page until facet 121h is rotated in the path of the beam. For this facet, the reflected ray would lie in the plane of the page since the surface facet 121h is parallel to principal axis 124. Naturally, as the beam encountered facets 121g, 121f, 121e . . . through 121a; the reflected ray is reflected in a direction which is a vertical component taking it out of the page and below the plane of the page. The maximum angle between the plane of the page and the reflected ray would be achieved when the beam strikes facet 121a.

Therefore, as successive facets 121 are rotated into the path of the beam, the angle of departure for the hypothetical reflected ray is moved, stepwise, from a maximum angle coming out of the top of the page to a maximum angle formed below the plane of the page.

Naturally, if one changes the ray which is considered the source, the geometry remains the same but the following will result. If the ray lying in the plane of the page is considered the reflected ray, it will be appreciated that rotation of the mirror, as described above, will cause the beam in the plane of the page to be reflected from successively varying positions from a plane perpendicular to the plane of the page of FIG. 2. Therefore, vertical scanning is accomplished by rotation of the mirror.

Furthermore, it should be noted that when the mirror rotates so that the beam successively intercepts facets 121a and 121p (or vice versa) the pattern of the raster scan accomplishes vertical retrace without the use of any stepping motor or similar device used for the vertical scan mirrors in prior art systems. This eliminates the need for having a motor which can step a mirror through a relatively large angle and bring it to an acceptable halt without overshoot or residual vibration during vertical retrace for the raster pattern.

It will also be appreciated from inspection of FIG. 2 that embodiments of the present invention may be designed with virtually any desired pattern for stepping through the vertical elements of the raster that the application requires. For example, an interlaced raster could be generated by doubling the number of facets and arranging them in a pattern so that the angles formed by the planes of a second series of facets with respect to principal axis 124 lie in between the successive angles formed by the first set of facets. Such variations in vertical scanning pattern are limited only by one's ability to machine the facets of a mirror constituting an embodiment of the present invention with sufficient precision, and create no additional control problems for a stepping motor-driven mirror as used in the prior art.

Figure 4:
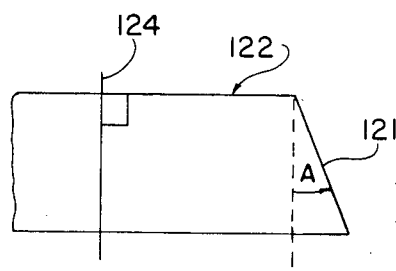
FIG. 4 is a cross-sectional view of the mirror along lines B—B.

FIG. 4 is a cross-sectional view of the mirror 122 along lines B—B shown in FIG. 2. The plane of each facet 121 is offset at a different angle, A, with respect to the axis of rotation 124. Table I specifies the angle A of offset for each facet 121. The magnitude of angle A as shown in FIG. 4 is exaggerated for the sake of clarity.

TABLE I

| Facet | \\multicolumn{16}{c}{Offset Angles} |
|---|---|

| Facet | 121a | 121b | 121c | 121d | 121e | 121f | 121g | 121h | 121i | 121j | 121k | 121L | 121m | 121n | 121o | 121p |
|---|---|---|---|---|---|---|---|---|---|---|---|---|---|---|---|---|
| A (degrees) | −4.375 | −3.75 | −3.125 | −2.50 | −1.875 | −1.25 | −0.625 | −0.00 | 0.625 | 1.25 | 1.875 | 2.50 | 3.125 | 3.75 | 4.375 | 5.00 |

FIG. 5 is a side view of the path of radiation 12 emitted from a target 10 in an infrared scanning system embodying the present invention. Radiation 12 is comprised of, for example, rays 12a–12e, each of which is emitted from a different vertical part of target 10. It will easily be understood by one skilled in the art that, by the proper selection of the offset angle Ah and of the focusing power of lens 126, a ray 12c from target 10 will be reflected by, for example, facet 121h of mirror 122, pass through the center 126a of lens 126 and be focused upon detector 133. Detector 133 is located behind focal point 129 of lens 126. Likewise, it will also be easily understood that rays 12a, 12b, 12d and 12e are reflected by facet 121h, pass through a point other than the center 126a of lens 126, and are refracted so that they do not strike detector 133. If mirror 122 is then rotated so that the next facet, 121i, is directed toward target 10, and, as shown in Table I, facet 121i has an offset angle Ai which is greater than offset angle Ah, it will also be easily understood that ray 12d will be reflected from facet 121i so that ray 12d passes through the center 126a of lens 126 and is focused on detector 133, and that rays 12a, 12b, 12c and 12e will not strike detector 133.

It will now be understood that, as mirror 122 is rotated, the particular facet 121 oriented toward target 10 at a given time causes the radiation 12 from a different vertical part of target 10 to be focused onto detector 133 so that, as mirror 122 is rotated through a full three hundred and sixty degrees, the entire target 10 is scanned vertically.

Figure 6:
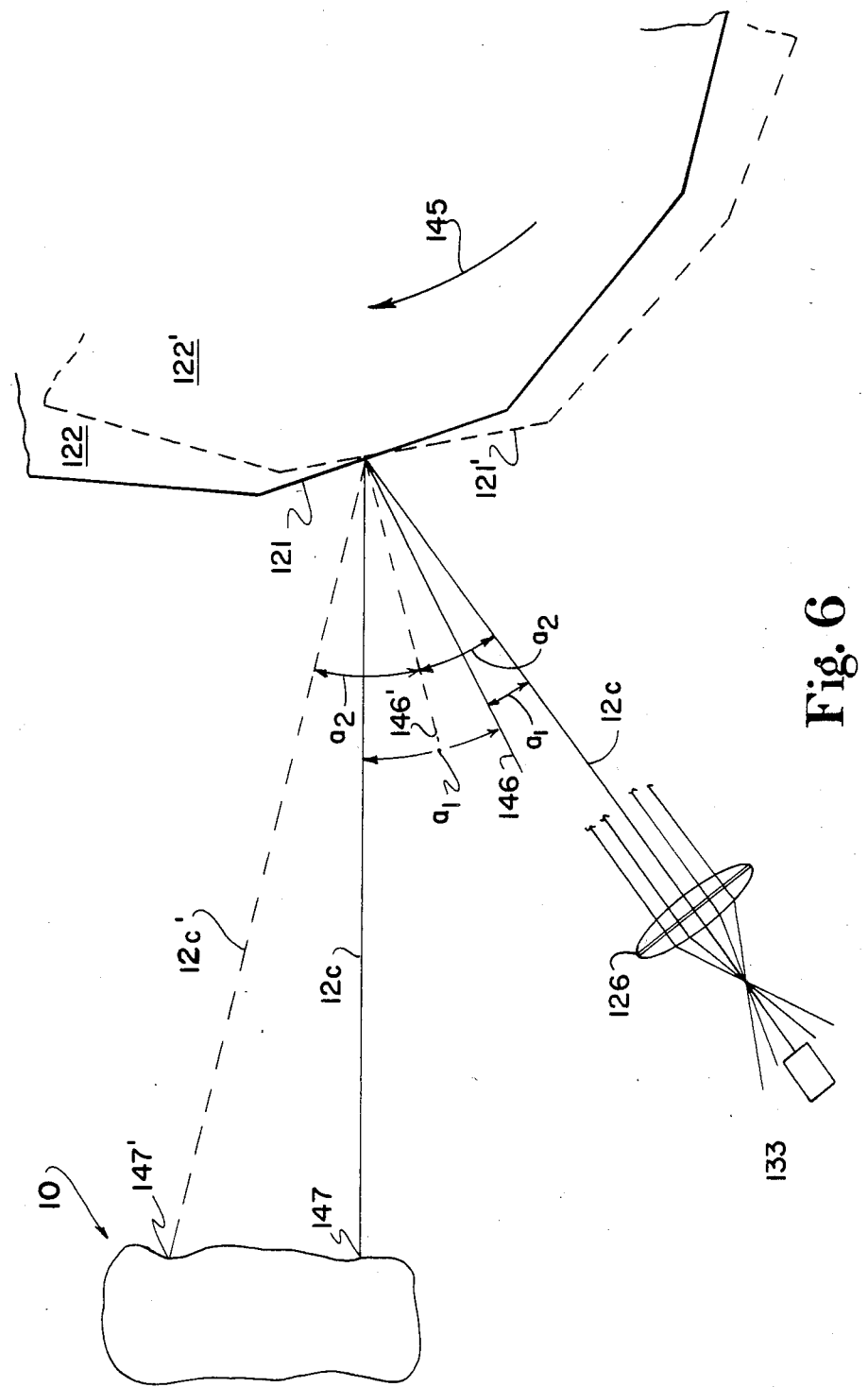
FIG. 6 is a top-view illustration of the path of radiation from a target to the detector.

FIG. 6 is a top view of the path of radiation 12 emitted from a target 10. This figure demonstrates the essentially known manner in which rotation of mirror 122 in the direction of arrow 145 implements the horizontal scanning. Thus, the plane of the paper of FIG. 6 is considered to be the horizontal plane in the conventions adopted in this specification. Lens 126 and detector 133 are the same elements shown and discussed in connection with FIG. 5. Mirror 122 is shown in a first position in asserted form in FIG. 6, and in a second position (in phantom) to which it will be rotated subsequent to being in the first position. Center ray 12c shown extending from detector 133 indicates the path of the ray of infrared radiation which illuminates detector 133 in both the positions shown in FIG. 6. Therefore, FIG. 6 illustrates the path for portions of ray 12c between target 10 in mirror 122 for the two positions of the mirror shown.

The path of this first portion of ray 12c is shown as line 12c extended from target 10 to facet 121 of the mirror at the first position, and is shown as a dotted line 12c' for the mirror in the second position. Using the well-known rule that the angle of incidence equals the angle of reflection with respect to a perpendicular from a reflecting surface, the following will be apparent. Line 146 shows the position of the normal to the surface of facet 121 when the mirror is in the first position. The angle between normal 146 and ray 12c is equal to $a_1$ for both the incident portion of ray 12c and the reflected portion travelling to detector 133.

When the mirror is in the position shown in phantom, the normal to phantom facet surface 121' is shown as 146' in FIG. 6. Under these circumstances, angle $a_2$ is equal to the angle of incidence and reflection and thus ray 12c' defines the point on target 10 from which radiation is focused on detector 133.

Clearly, during the intermediate continuous rotation of mirror 122 from the position of normal 146 to normal 146', the corresponding incident ray 12c has swept horizontally between its first position shown at 147 and its second position shown at 147'. Thus, horizontal sweeping of target 10 is accomplished in a manner quite similar to that of prior art systems using mirrors composed of a plurality of planar facets all lying in planes parallel to the axis of rotation of the mirror.

It should be noted that facet 121 shown in FIG. 6 is taken to be an exemplary facet and that the geometry for the horizontal plane illustrated in FIG. 6 holds irrespective of the angle A shown and described in connection with FIGS. 4 and 5. In other words, the geometry of the sweep of ray 12c in the horizontal plane shown in FIG. 6 is actually the projection onto the horizontal plane (the plane perpendicular to the axis of rotation of the mirror) of the rays 12c that actually travel through three dimensional space. Therefore, the angle A (see Table I above) between the plane of the respective facet 121 and the principal axis of the mirror will determine the vertical location on target 10 for which the sweep between point 147 and 147' is accomplished by rotation of the mirror between the two examplary positions shown in FIG. 6.

Considering this further, the following will become apparent. So long as facets 121 are planar, and a perpendicular to the plane of each respective facet drawn at the center of the facet (or more particularly from the center of the portion of the facet actually used in the sweep of target 120) passes through the axis of rotation of the mirror, the projection onto the horizontal plane of all of the rays will be as shown in FIG. 6. Therefore this projection will duplicate the geometry of similar sweeps for prior mirrors in which all of the facets or planes parallel to the axis of rotation of the mirror. Stated another way, if the planar facets are arranged around the periphery of the mirror such that a perpendicular to each facet at the center of a line in the plane of the facet and a plane perpendicular to the axis of rotation passes through the axis of rotation, the horizontal sweeping illustrated in FIG. 6 will be independent of the vertical component of the angles of incidence and reflection illustrated in FIG. 5.

Therefore, as long as this design constraint is followed, the linearity of the horizontal sweep will be identical to that obtained for prior art systems. If distance L is taken to be the length of incident ray 12c' and it is assumed for the moment that target 10 presents a surface to be scanned which is substantially planar and perpendicular to ray 12c, it will be readily appreciated from simple trigonometry that the distance between point 147' and 147 may be expressed as L tan (wT) where T is equal to the time required for mirror 122 to rotate between the two positions illustrated in FIG. 6. It will be appreciated that the speed of the horizontal sweep dx/dt will be as given by Ld tan (wt))/dt. This may be readily expressed as Lw(1/cos$^2$ (wt)). Therefore, so long as the horizontal line of target 10 which is scanned by any particular facet 121 of mirror 122 is positioned so that the center of the scan line on target 10 is positioned approximately such that the incident ray 12c is perpendicular to the plane of the scanned target, the rate of movement of the horizontal scan line will approximate a constant to give aceptable linearity to the system. This is substantially the same result as achieved in the prior art.

Since, as discussed above, the rotation of mirror 122, because of its angled facets 121, causes the target 10 to be scanned vertically, and since the rotation of the mirror 122 causes the target 10 to be scanned horizontally, it is apparent that the present invention accomplishes both the vertical and the horizontal scanning of target 10. Therefore it replaces mirror 15, the flat-faceted rotating polygonal mirror 22, and eliminates the need for one focusing lens 13 and one motor 16 in the prior system shown in FIG. 1.

Figure 7:
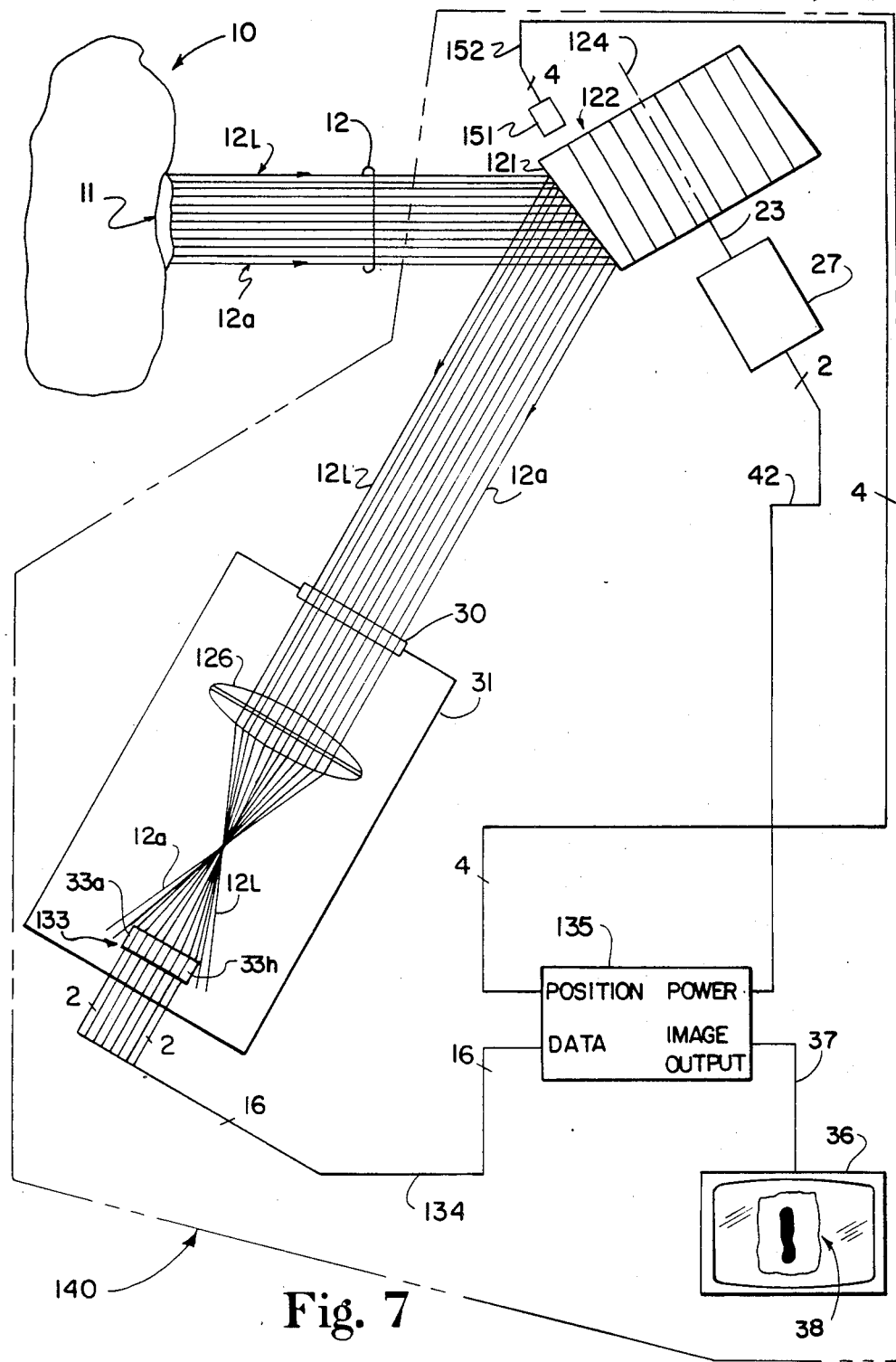
FIG. 7 is a block diagram of an infrared target scanning system using the present invention.

FIG. 7 is a block diagram of the preferred embodiment of the system of the present invention, an infrared target scanning system 40. Infrared target scanning system 140 is comprised of an angle-faceted polygonal mirror 122, a position sensing device 151, a drive shaft 23, a constant speed motor 27, a window 30, a cooling chamber 31, a focusing lens 126, a column of infrared detector 133, a signal processor 135, a display device 36 and conductors 37, 42, 135 and 152 for conducting electrical signals. A target 10 emits infrared radiation 12 from an area 11. Radiation 12 is comprised of, for example, twelve parallel rays 12a through 12-l which are emitted from different vertical points in area 11. It should be understood by those skilled in the art that a collimating lens system may be employed in the optical path between target 10 and mirror 122. Radiation 12 impinges upon and is reflected by one of the angled facets, 121h for example, of the angle-faceted polygonal mirror 122. Radiation 12 then passes through window 30 and is focused by lens 126.

Infrared detector column 133 is comprised of, in this example, a column of eight infrared detectors 33. Lens 126 causes rays 12c through 12j to strike infrared detectors 33a through 33h and causes electrical signals to be output from infrared detectors 33a through 33h onto conductors 134. Lens 126 also causes rays 12a, 12b, 12k and 12-l to miss infrared detector column 133. It is therefore seen that the outputs of detectors 33a through 33h correspond to the radiation emitted by a vertical column of area 11 of target 10. As polygonal mirror 122 rotates, the vertical column in the central part of area 11 which is reflected by facet 121h onto detector column 133 will be moved in a horizontal direction.

Polygonal mirror 122 has sixteen angled-facets 121, so rotating polygonal mirror 122 through 22.5 degrees will cause a complete horizontal scan of target 10. However, since there are eight detectors 33, rotating polygonal mirror 122 through 22.5 degrees will also cause the simultaneous scan of eight adjacent horizontal lines of target 10. It should be understood that in the preferred embodiment, less than the entire horizontal width of each facet 121 is used to generate each scan line so that a complete horizontal scan line is generated in response to rotation of mirror 122 through an angle of slightly less than 22.5 degrees.

As mirror 122 continues to rotate, facet 121h will no longer reflect radiation 12 onto detector column 133, and facet 121i will begin to reflect radiation 12 onto detector column 133. However, as previously explained, the offset angle A of each facet 121 is different, and therefore the radiation 12 from a different vertical column of area 11 of target 10 will be reflected by facet 121i toward detector column 133. Since the offset angle A of facet 121i is greater than the offset angle of facet 121h, the next lower eight horizontal lines of target 10 will be scanned by the rotation of mirror 122 through the next 22.5 degrees. Therefore, as mirror 122 rotates, the target 10 will be scanned, from top to bottom, eight horizontal lines at a time.

In the infrared target scanning system 140 of the preferred embodiment, each horizontal line consists of one hundred and twenty-eight pixels where, as is known to those skilled in the art, a pixel is an area of target 10 which is sufficiently small that the radiation 12 from that area falls on only one infrared detector 33 of column 133 at a time. Since there are sixteen facets 121 to polygonal mirror 122, and each facet 121 reflects the radiation from eight vertical pixels of target 10 onto column 133, it is seen that a complete image of the target will be one hundred and twenty-eight pixels by one hundred and twenty-eight pixels.

In the conventional passive infrared target scanning system 40 of FIG. 1, the system 40 scans, from left to right, one horizontal line of the target 10 at a time, and the output of detector 33 is a series of pixels: line 1: 0, 1, 2, 3, 4, 5 ... 127; line 2: 128, 129, 130 ... 255; line 3: 256, 257, 258 ... 383; and so on, with the rightmost pixel of the lowest horizontal line being pixel number 16383. However, in the infrared target scanning system of FIG. 7, since eight horizontal lines are scanned simultaneously, then at the first point in time, pixels 0, 128, 256, 384, 512, 640, 768 and 896 will be simultaneously output by detectors 33a-33h on cable 134, where cable 134 is typically comprised of eight coaxial cables. At the next point in time, as target 10 is horizontally scanned by the rotation of polygonal 122, the output of detectors 33a through 33h will be pixels 1, 129, 257, 385, 513, 641, 769 and 897. This process is repeated until the entire target 10 is scanned. Therefore at the end of the complete target scan, the outputs of detectors 33a through 33h will be pixels 15487, 15615, 15743, 15871, 15999, 16127, 16255 and 16383.

Since, as is well known to those skilled in the art, a typical display monitor 36 displays the target image 38 by tracing one horizontal line at a time, the pixels must be provided to display monitor 36 in the following order: 0, 1, 2, 3, 4 ... 16380, 16381, 16382, 16383. However, because eight vertical points are simultaneously viewed in the system 140, the signal processor 135 must simultaneously accept the eight pixels from column detector 133, store all the pixels for a complete target scan, and reorder the pixel sequence into the format, shown above, that will allow display monitor 36 to display the proper target image 38.

As shown in FIG. 2, mirror 122 has a reflective strip 150 on its top, where strip 150 is mounted on the facet 121a side of a radial 153 extending from the principal axis 124 to the junction 153 between facets 121a and 121p. Position detector 151 (FIG. 7) is positioned above the top surface 120 of polygonal mirror 122 and facing toward the top surface 120 of polygonal mirror 122 so that position detector 151 will output a SYNC pulse indicating that scanning of target 10 by angled-facet 121a is beginning. The SYNC output from position detector 151 is provided to the position input of signal processor 135 over conductor 152. Position detector 151 may, for example, consist of a light emitting diode (LED) and a photodiode. If an LED and a photodiode are used for position detector 151, conductor 152 will be a two-pair cable, where one pair is used for power to the LED and the other pair is used to transmit the SYNC output pulse.

As previously described, mirror 122 is rotated about its principal axis 124 by a constant speed motor 27. Power to operate motor 27 is provided by the signal processor 135 over conductor 42. It will be appreciated by one skilled in the art that the signal processor 135 may, if desired, regulate the speed of motor 27. Means for regulating the speed of motor 27 are well known to those skilled in the art.

It will also be seen, from an inspection of FIG. 7, that lens 126 is enclosed, along with detector column 133, in cooling chamber 31. It will be appreciated by one skilled in the art that cooling lens 126 to −40 degrees centigrade substantially reduces the blackbody radiation of lens 126, thereby reducing the inherent noise in system 140 and improving the sensitivity of system 140.

It will be appreciated by one skilled in the art that the present invention is not limited to infrared radiation but may also be easily used with visible and ultraviolet radiation as well. The use of the present invention will therefore be limited, with respect to longer wavelength radiation, by any limitations on the size of polygonal mirror 122 and, with respect to shorter wavelength radiation, by the smoothness of and reflectivity of the facets 121.

Although the present invention 122 has been described as used in a passive infrared target scanning system, it will be appreciated that the present invention may also be used in an active target scanning system, that is, a system which does not depend upon the radiation emitted by a target, but has an energy source for illuminating the target at the desired wavelength. Such an active system could be used, for example, to obtain information about a target which has a low emissivity at the desired wavelength.

It will also be appreciated by one skilled in the art that other embodiments and uses of the present invention may be constructed based on the disclosure herein and that the foregoing description of the preferred embodiment has been by way of example only. Therefore, the scope of the present invention is to be limited only by the claims below.

We claim:

1. A target scanning system, comprising:
   a polygonal having a principal axis and a predetermined number of facets for reflecting an image of a target, each of said facets having a predetermined area and defining a plane which intersects said principal axis at a predetermined angle, each said plane defining a different said predetermined angle;
   means for rotating said polygonal mirror at a predetermined speed about said principal axis;
   focusing means for generating a focused image by focusing a predetermined portion of said image of said target reflected from one of said facets;
   detecting means responsive to said focused image for converting said focused image into electrical signals;
   cooling means enclosing said focusing means and said detecting means for maintaining said focusing means and said detecting means at a predetermined temperature; and
   display means coupled to said detecting means for displaying visible indications of said electrical signals;
   wherein said rotating of said polygonal mirror causes said target to be scanned in a first predetermined direction, and each said predetermined angle causes said target to be scanned in a second predetermined direction.

2. The system of claim 1, wherein said focusing means includes a lens.

3. The system of claim 1, wherein said detecting means includes at least one infrared detector.

4. The system of claim 1, wherein said display means includes a cathode ray tube.

* * * * *